United States Patent [19]
Wilkinson

[11] 3,924,773
[45] Dec. 9, 1975

[54] FUEL TANK
[76] Inventor: Nelson C. Wilkinson, 1818 - 4th St., Rensselaer, N.Y. 12144
[22] Filed: May 1, 1974
[21] Appl. No.: 465,807

[52] U.S. Cl.............. 220/88 B; 137/461; 137/587; 220/9 A; 251/351
[51] Int. Cl.²................... F16K 17/20; B65D 25/18
[58] Field of Search .... 220/88 B, 63 A, 85 B, 88 R, 220/88 A, 63 A, 9 A; 137/625.38, 587, 625.39, 458, 460, 498, 456, 461, 467; 251/351, 353; 244/135 B

[56] References Cited
UNITED STATES PATENTS

| | | | |
|---|---|---|---|
| 542,024 | 7/1895 | McIlhenny | 137/461 |
| 1,766,740 | 6/1930 | Bitchman | 251/351 |
| 2,153,555 | 4/1939 | Gallery | 220/88 B |
| 2,404,418 | 7/1946 | Walker | 220/63 A |
| 2,438,965 | 4/1948 | Dasher | 220/63 A |
| 2,781,775 | 2/1957 | Merrill | 137/498 |
| 2,889,955 | 6/1959 | Naulty et al. | 220/88 B |
| 2,985,180 | 5/1961 | Grayson | 251/351 |
| 3,152,609 | 10/1964 | Hegna | 137/587 |
| 3,184,091 | 5/1965 | Hoffman | 251/351 |
| 3,203,665 | 8/1965 | Grant et al. | 251/351 |
| 3,386,632 | 6/1968 | Sager | 251/351 |
| 3,779,420 | 12/1973 | Knaus | 220/85 B |
| 3,823,734 | 7/1974 | McJones | 137/498 |
| 3,837,619 | 9/1974 | Sherman | 251/353 |

*Primary Examiner*—William Price
*Assistant Examiner*—Allan N. Shoap
*Attorney, Agent, or Firm*—Walter F. Wessendorf, Jr.

[57] ABSTRACT

Discloses a double-walled fuel tank defining a chamber having carbon dioxide under pressure therein from a regulated source. The walls carry filler-pipe, vent-pipe and fuel-line housings which complementally receive a filler pipe, vent pipe and fuel-line valve, respectively. The outer wall mounts pressure-relief valves. In an accident with imppact almost sufficient to rupture the outer wall, instantaneously, the pressure-relief valves automatically open to relieve the chamber pressure, and the build up of pressure on the fuel in the fuel tank causes the fuel-line valve to seat in closing relationship in its housing. In addition, upon rupture of the outer wall of the fuel tank in an accident, carbon dioxide pouring from the ruptured outer wall will smother the fuel tank to minimize any chance of fire or explosion.

8 Claims, 3 Drawing Figures

U.S. Patent     Dec. 9, 1975     3,924,773
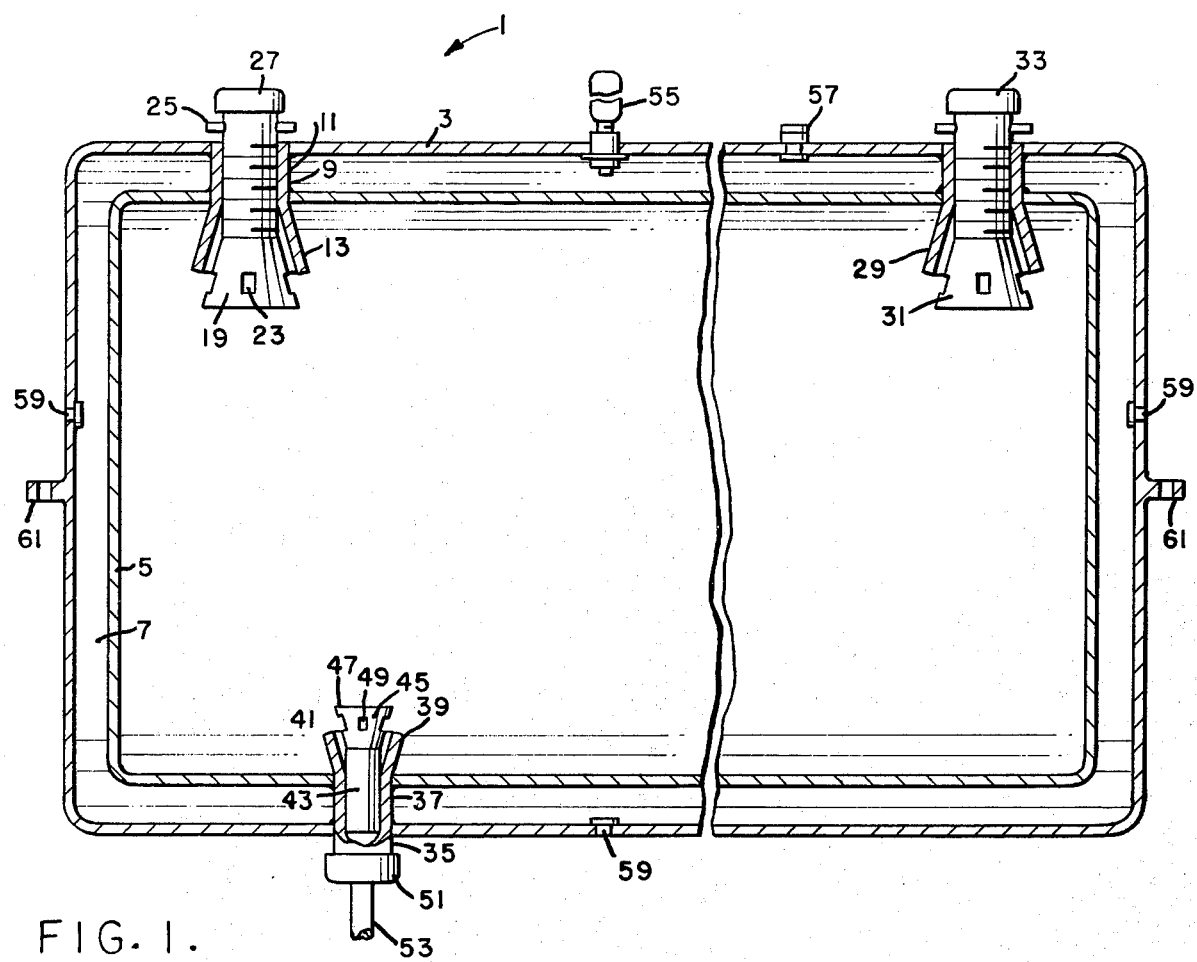
FIG. 1.
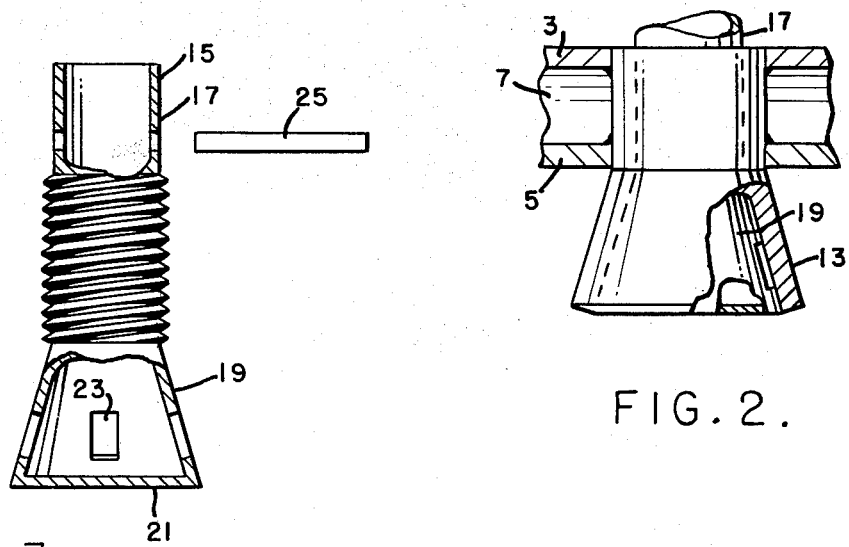
FIG. 3.                    FIG. 2.

FUEL TANK

This invention relates to fuel tanks for motor vehicles, airplanes and the like.

When motor vehicles, airplanes and the like are involved in accidents, their conventional fuel tanks sometimes rupture with resulting fires and explosions from the napalm-effect from the sprayed-out fuel from their fuel tanks. Then too, the impacts to fuel tanks and impacts transmitted to the fuel tanks from accidents may almost rupture the fuel tanks but cause, nevertheless, the seams of conventional fuel tanks to leak fuel. The objects of this invention are to contribute to the solution of the problems of the art by providing a doublewalled fuel tank having a chamber under pressure from carbon dioxide which acts as a shock absorber to absorb impact shocks to the fuel tank from accidents, by providing pressure-relief valves that relieve the pressure build up on the chamber and by providing a fuel-line valve that seats in closing relationship with its fuel-line housing; and, when the fuel tank ruptures from an accident, to smother the fuel tank with carbon dioxide to prevent fire and explosion of the fuel.

These objects and other objects of the invention should be discerned and appreciated from the detailed specification taken in conjunction with the drawings, wherein like reference numeral refer to similar parts throughout the several views, in which:

FIG. 1 is a sectional view of the fuel tank of this invention showing the fuel tank in a configuration that approximates the configuration of a conventional fuel tank utilized for a motor vehicle;

FIG. 2 is a partial view of the filler pipe of this invention and which filler pipe is shown in closed relationship with its complemental filler-pipe housing; and FIG. 3 is a view of the filler pipe of this invention and which filler pipe is partly broken away in section.

To facilitate the understanding of the invention, a nomenclature list is hereby provided:

NOMENCLATURE generally refers to the invention
outer wall
inner wall
chamber
filler-pipe housing
cylindrical portion of filler-pipe housing 9
conical portion of filler-pipe housing 9
filler pipe
cylindrical portion of filler pipe 15
conical portion of filler pipe 15
closed bottom of conical portion 19
wall opening in conical portion 19
integral lug on cylindrical portion 17
cap on cylindrical portion 17
vent-pipe housing
vent pipe
cap for vent pipe 31
fuel-line housing
cylindrical portion of fuel-line housing 35
conical portion of fuel-line housing 35
fuel-line valve
cylindrical portion of fuel-line valve 41
conical portion of fuel-line valve 41
closed bottom of conical portion 45
wall opening in conical portion 45
end-cap fitting
fuel line
gas-pressure regulator
valve
pressure-relief valve
mounting tab In FIG. 1 of the drawings, reference numeral 1 generally refers to the invention. Although the fuel tank 1 shown in cross-section in FIG. 1 approximates the configuration of a conventional fuel tank utilized for motor vehicles, it should be clearly understood and appreciated, however, that the fuel tank 1 of this invention can be of any suitable configuration.

Outer wall 3 is made of suitable material such as hard rubber in which cording or the like is imbedded and such that outer wall 3 possesses strength and structural rigidity. Inner wall 5 is made of suitable material, such as neoprene or the like, for storing gasoline and other fuel. Outer wall 3 and inner wall 5 define a chamber 7.

A filler-pipe housing 9 has an internally threaded, open cylindrical portion 11 which outwardly flares to a conical portion 13. The cylindrical portion 11 is suitably fixed to and sealed to the outer wall 3 and inner wall 5, such as by vulcanizing. Filler-pipe housing 9 receives in operative engagement therewith a complemental filler pipe 15.

Filler pipe 15 has an externally threaded, open cylindrical portion 17 which outwardly flares to a conical portion 19 with a closed bottom 21 and with suitable wall openings 23 formed therethrough, as shown. Cylindrical portion 17 has integral lugs 25 transversely projecting outwardly therefrom to facilitate manipulative turning of filler pipe 15. A cap 27 is disposed for covering relationship upon the end of cylindrical portion 17.

As viewed in FIG. 1, after removal of cap 27 and appropriate manipulation of lugs 25 to dispose filler pipe 15 to its downward open position relative to filler-pipe housing 9, as shown in FIG. 1, communication is established with the interior of inner wall 5 to introduce gasoline or other fuel therein. Upon appropriate manipulation of lugs 25 to dispose filler pipe 15 to its upward closed position relative to filler-pipe housing 9, as shown in FIG. 2, communication is closed to the interior of inner wall 5 by the exterior of conical portion 19 seating and sealing itself against the complemental interior of conical portion 13.

Filler-pipe housing 9 and filler pipe 15 are made of suitable material such as metal.

A vent-pipe housing 29 with its vent pipe 31, both of similar construction and operation as filler-pipe housing 9 and filler pipe 15, respectively, is similarly fixed to and sealed to outer wall 3 and inner wall 5. A cap 33 is disposed on the end of vent pipe 31.

A fuel-line housing 35 has an open cylindrical portion 37 which outwardly flares to a conical portion 39. The cylindrical portion 37 is suitably fixed to and sealed to the outer wall 3 and inner wall 5, such as by vulcanizing. Fuelline housing 35 internally receives and carries, by means of slight interference fit, a complemental fuel-line valve 41.

Fuel-line valve 41 has an open cylindrical portion 43, restricted at its end, which outwardly flares to a conical portion 45 with a closed bottom 47 and with suitable wall openings 49 formed therethrough. The fuel-line housing 35 and its valve 41 are made of suitable material such as metal.

An end-cap fitting 51, suitably mounted in fixed relationship on the end of cylindrical portion 37, receives and fixedly mounts fuel line 53. Fuel line 53 remains in communication with the interior of inner wall 5 until such communication is closed by fuel-line valve 41, as will be described hereinafter.

A valve-controlled, gas-pressure regulator 55, in communication with a source of carbon dioxide under comparatively greater pressure, is in communication with chamber 7. A valve 57, suitably mounted as shown on outer wall 3 and in communication with chamber 7, is hand-operable to open or close communication of chamber 7 with the atmosphere. Spring-biased, automatic, pressure-relief valves 59, suitably mounted as shown on outer wall 3, are responsive to discrete pressure in chamber 7 to automatically open to establish communication of chamber 7 with the atmosphere.

Outer wall 3 has integral mounting tabs 61 for suitable mounting of the fuel tank 1 on a vehicle.

In filling the fuel tank 1, the valve controlling the carbon dioxide source to regulator 55 is closed, valve 57 is opened thereby relieving chamber 7 of any pressure from the carbon dioxide in chamber 7, the caps 27 and 33 are removed from their filler pipe 15 and vent pipe 31, respectively, lugs 25 on filler and vent pipes 15 and 31 are appropriately manipulated to dispose filler and vent pipes 15 and 31 to their downward open positions, and the gasoline or other fuel is appropriately introduced through filler pipe 15 to fill the interior of inner wall 5.

After the fuel tank 1 has been filled, the lugs 25 on filler and vent pipes 15 and 31 are appropriately manipulated to dispose filler and vent pipes 15 and 31 to their upward closed positions, caps 27 and 33 are replaced on their filler and vent pipes 15 and 31, respectively, valve 57 is closed and the valve controlling the pressurized, carbon-dioxide source to the regulator 55 is opened. When the fuel tank of this invention is mounted on a motor vehicle, a regulator 55 is utilized that will maintain and control the carbon dioxide in chamber 7 within the 7 psi range for the reason that, in a motor vehicle, fuel is usually pumped by the fuel pump to the carburetor within the 7 psi range.

Another attribute of this invention arises from the fact that since regulator 55 is maintaining and controlling the carbon dioxide in chamber 7 within the 7 psi range and thereby similarly maintaining and controlling the fuel in the interior of inner wall 5 within the same 7 psi range, this phenomenon in effect has the attribute of functioning as an additional in-line fuel pump.

When a motor vehicle mounting fuel tank 1 is involved in an accident with the result that the impact to fuel tank 1, or the impact transmitted to fuel tank 1, is of sufficient magnitude almost sufficient in turn to rupture outer wall 3, then, instantaneously, the pressure-relief valves 59 will open to relieve the great pressure build up in chamber 7 with carbon dioxide flowing through the open pressure-relief valves 59 and to relieve the great pressure build up acting upon the fuel in the interior of inner wall 5, and this great pressure build up acting upon the fuel in the interior of inner wall 5 will act against the closed bottom 47 of conical portion 45, with closed bottom 47 functioning as a ram, and cause this conical portion to seat itself against the complemental conical portion 39 of the fuel-line housing 35 to not only prevent any fuel from flowing through the fuel line 53 from the interior of inner wall 5, but also to prevent any fire or explosion from resulting.

When the motor vehicle mounting fuel tank 1 is involved in an accident such that the outer wall ruptures, the same operative functions will take place as have been described, but, in addition thereto, the carbon dioxide pouring from the ruptured outer wall 3 will smother fuel tank 1 to thereby minimize any chance of a fire or explosion from happening.

When the outer wall 3 is ruptured in an accident, the effect of this invention is to provide an instantaneously operating carbon-dioxide fire extinguisher to smother the fuel tank 1 with carbon dioxide.

A gas is compressible while a liquid is not. Accordingly, another attribute of this invention is that the carbon dioxide under pressure in chamber 7 acts as a shock absorber such that outer wall 3 can sustain impacts of significant magnitude without rupturing outer wall 3 but which impacts would otherwise rupture a conventional fuel tank.

Having thusly described my invention, I claim:

1. A fuel tank for liquid fuel having a fuel line and having fuel-line, valve means responsive to pressure build up on the fuel in said fuel tank to permanently close said fuel line, said valve means comprising a fuel-line housing and a fuel-line valve, said fuel tank carrying said fuel-line housing, said fuel-line housing being in communication with said fuel line and said fuel tank, said fuel-line housing having an open cylindrical portion and an open conical portion outwardly flared therefrom, said fuel-line valve having an open cylindrical portion and conical portion outwardly flared therefrom, said conical portion of said fuel-line valve having a closed bottom, said conical portion of said fuel-line valve having wall opening formed therethrough, said fuel-line valve being complemental with said fuel-line housing, said cylindrical portion of said fuel-line housing receiving and carrying, by means of slight interference fit, said cylindrical portion of said fuel-line valve, said liquid fuel in said fuel tank communicating with said fuel line through said wall openings in said conical portion of said fuel-line valve, through said open cylindrical portion of said fuel-line valve and through said open cylindrical portion of said fuel-line housing when said fuel-line valve is in its open position, said pressure build up on said liquid fuel in said fuel tank acting upon said closed bottom of said conical portion of said fuel-line valve to cause said conical portion of said fuel-line valve to permanently seat itself against said open conical portion of said fuel-line housing by interference fit to permanently close communication of said fuel tank with said fuel line.

2. A fuel tank in accordance with claim 1, wherein said fuel tank has walls defining a chamber, wherein said walls carry a filler-pipe housing and a vent-pipe housing, wherein are further provided a filler pipe and a vent pipe, and wherein said filler-pipe and vent-pipe housings complementally receive said filler pipe and vent pipe, respectively.

3. A fuel tank in accordance with claim 1, wherein said fuel tank has walls defining a chamber, wherein is further provided fluid means under pressure communicating with said chamber, wherein one of said walls carries pressure-relief valve means in communication with said chamber, said pressure-relief valve means, when open, establishing communication of said chamber with the atmosphere, and said pressure-relief valve means being opened in response to pressure build up in said chamber.

4. A fuel tank in accordance with claim 1, wherein said fuel tank has walls defining a chamber, wherein is further provided fluid means under pressure communicating with said chamber, wherein one of said walls carries regulator means establishing communication with said chamber and said fluid means under pressure, and wherein said regulator means maintains and controls the pressure of said fluid means in said chamber.

5. A fuel tank in accordance with claim 1, wherein said fuel tank has walls defining a chamber, wherein said walls comprise an outer wall and an inner wall, wherein said outer wall is made of suitable material such as hard rubber or the like in which is imbedded cording and the like such that said outer wall possesses strength and structural rigidity, and wherein said inner wall is made of suitable material such as neoprene or the like.

6. A fuel tank in accordance with claim 1, wherein said fuel tank has walls defining a chamber, wherein is further provided fluid means under pressure communicating with said chamber, and wherein said fluid means under pressure communicating with said chamber is a fire-extinguishing gas such as carbon dioxide.

7. A fuel tank in accordance with claim 1, wherein said fuel tank has walls defining a chamber, wherein said walls carry a filler-pipe housing and a vent-pipe housing, wherein said housings have open cylindrical portions and outwardly flared conical portions, wherein are further provided a filler pipe and a vent pipe, wherein said filler-pipe and vent-pipe housings complementally receive said filler pipe and vent pipe, respectively, and wherein said filler pipe and vent pipe threadedly engage their complemental filler-pipe and vent-pipe housings, respectively.

8. A fuel tank in accordance with claim 1, wherein said fuel tank has walls defining a chamber, wherein is further provided fluid means under pressure communicating with said chamber, wherein one of said walls carries pressure-relief valve means in communication with said chamber, said pressure-relief valve means, when open, establishing communication of said chamber with the atmosphere, and said pressure-relief valve means being opened in response to pressure build up in said chamber; wherein one of said walls carries regulator means establishing communication with said chamber and said fluid means under pressure, and wherein said regulator means maintains and controls the pressure of said fluid means in said chamber; wherein said walls comprise an outer wall and an inner wall, wherein said outer wall is made of suitable material such as hard rubber or the like in which is imbedded cording and the like such that said outer wall possesses strength and structural rigidity, and wherein said inner wall is made of suitable material such as neoprene or the like; wherein said fluid means under pressure communicating with said chamber is a fire-extinguishing gas such as carbon dioxide; and wherein said walls carry a filler-pipe housing and a vent-pipe housing, wherein said filler-pipe and vent-pipe housings have open cylindrical portions and outwardly flared conical portions, wherein are further provided a filler pipe and a vent pipe, wherein said filler-pipe and vent-pipe housings complementally receive said filler pipe and vent pipe, respectively, and wherein said filler pipe and vent pipe threadedly engage their complemental filler-pipe and vent-pipe housings, respectively.

* * * * *